UNITED STATES PATENT OFFICE.

ASHER S. TAYLOR, OF SAN FRANCISCO, CALIFORNIA.

IMPROVED BEVERAGE OR CHAMPAGNE MEAD.

Specification forming part of Letters Patent No. 106,428, dated August 16, 1870.

*To all whom it may concern:*

Be it known that I, ASHER S. TAYLOR, of the city and county of San Francisco, State of California, have invented an Improved Beverage called "Champagne Mead;" and I do hereby declare that the following specification contains a full enumeration of the ingredients employed in its manufacture, together with the proportions of each to be used, so that others will be able to manufacture the same without further invention or experiment.

My invention relates to an improved composition of ingredients which forms an exceedingly pleasant and healthful drink, and which I call "champagne mead."

To make my beverage I add to forty (40) gallons of good cider the following spices and flavoring-extracts: Ginger, four (4) pints; mace, three (3) ounces; orange-water, one (1) gallon; vanilla, three (3) ounces; anise, one (1) pint. To this mixture some predominating flavor can be given by adding either of the following ingredients: Cloves, two (2) ounces; cinnamon, one (1) ounce; nutmeg, one (1) ounce; pine-apple, one (1) ounce.

Either of the latter articles will give a distinctive flavor to the mixture, according to which is used. The mixture thus produced is then placed in a soda-fountain, with a certain proportion of water, generally four-fifths of the whole, and is charged with carbonic gas, in the usual manner. A sirup is then prepared by boiling water and sugar or honey together, and flavored with a small quantity of orange, lemon, and citric acid, which has previously been well cut with alcohol. A small quantity of this sirup is placed in the bottles which are intended to hold the beverage, and the mixture in the fountain drawn off into them, when they are immediately corked in a substantial manner, and are ready for use. After being properly bottled the beverage can be kept a great length of time without deterioration. This will be found to be an excellent drink and very pleasant to the taste.

Having thus described my invention, what I claim, and desire to secure by Letters Patent, is—

My improved beverage, called "champagne mead," composed of the ingredients above enumerated, and mixed in about the proportions and manner above described.

In witness that the above-described invention is claimed by me I have hereunto set my hand and seal.

ASHER S. TAYLOR. [L. S.]

Witnesses:
W. B. TURNER,
JOHN C. MORITZ.